Patented Oct. 29, 1929

1,733,676

UNITED STATES PATENT OFFICE

ROYALE HILLMAN STEVENS, GERALD CHAD NORRIS, AND WILLIAM NELSON WATSON, OF BROKEN HILL, NORTHERN RHODESIA, SOUTH AFRICA, ASSIGNORS TO RHODESIA BROKEN HILL DEVELOPMENT COMPANY LIMITED, OF BROKEN HILL, NORTHERN RHODESIA

PURIFICATION OF INDUSTRIAL ZINC-SULPHATE SOLUTIONS PREPARATORY TO ELECTROLYSIS

No Drawing. Application filed September 24, 1926, Serial No. 137,623, and in Southern Rhodesia April 7, 1926.

This invention relates to the treatment of zinc sulphate solutions, particularly those obtained by leaching ores or other zinc-bearing material with sulphuric acid, for the removal therefrom of nickel preparatory to the electro-deposition of the zinc from such solutions.

It is known that presence of nickel and cobalt in such solutions is detrimental to the electrolytic deposition of the zinc and that the substantially complete removal of these impurities is necessary for effective working.

The usual methods of purification of zinc sulphate solutions preparatory to electrolysis comprise preliminary treatment of the solution with a basic material such as zinc oxide, zinc oxide bearing materials, lime, limerock, or the like, for the precipitation of silica, iron, alumina and other impurities precipitated by a base; and then final purification of the solution with metallic zinc, usually in the form of zinc dust or blue powder, for the precipitation of copper, cadmium, arsenic, antimony etc. When the solution contains cobalt, it is heated and soluble arsenic and copper compounds, if they are not already present in the solution in sufficient amounts are added with the zinc in order to precipitate the cobalt.

In attacking the problem of removing nickel from zinc sulphate solutions, the general analogy between cobalt and nickel suggested that the aforesaid process for the removal of cobalt might also be applicable to the removal of nickel. Laboratory tests on these lines were favourable; but the attempts to operate the process industrially were unsuccessful. In some cases precipitation of the nickel failed altogether, and in all cases the results were erratic and unreliable.

Research to ascertain the cause of these unsatisfactory results has demonstrated that the precipitation of nickel by the zinc-copper-arsenic method is exceedingly sensitive and in general is adversely affected in some degree by the presence of any substance foreign to the necessary steps for the leaching of the ore with sulphuric acid and the purification of the resulting zinc sulphate solution by the method above described.

It was found, for instance, that quite apart from impurities dissolved in the solution, the presence of suspended silica and alumina, due to imperfect filtering of the solution after precipitation of those substances, was detrimental to the precipitation of nickel.

The research also demonstrated that detrimental results were particularly marked when organic substances were present, this point being of special importance since organic substances such as wood, canvas, and tar are commonly used in the construction of containers of, and appliances for the handling of zinc sulphate solutions in industrial plants.

Experiments have been conducted with a number of organic substances with which, for various reasons, the zinc solution may come in contact, or which, for various reasons, may contaminate the zinc solution. The results of such experiments are tabulated hereunder. "A" indicates materials likely to be used in the construction of the precipitating vessels, stirring apparatus therefor and appliances for the clarification of solutions; "B" lubricants which may be applied to the bearings of the stirring apparatus etc., and "C" reagents employed for flotation and other purposes in the previous treatment of the ore leach residue or zinc solution.

| | Completely prevent purification | Retard purification strongly | Retard purification |
|---|---|---|---|
| A | Canvas<br>Teak timber | Wool<br>Hemp<br>Pine timber | Coal tar bitumen.<br>Timbers generally. |
| B | | | Cup grease. |
| C | Tar oil<br>Wattle tar oil<br>Alkali xanthate<br>Oxalic acid | Glue<br>Turpentine<br>Sodium acetate | Soap.<br>Resin.<br>Eucalyptus oil. |

It has also been demonstrated that time is a factor affecting the precipitation of the nickel. It is found that in the presence of substances which retard but do not entirely inhibit the precipitation, the nickel, after being precipitated, tends to redissolve when the solution is allowed to remain in contact with such substances.

The present invention accordingly consists in industrially removing nickel from zinc sulphate solutions, preparatory to the electrolysis of the latter, by treating the neutral or slightly acid solution, preferably at an elevated temperature, with zinc dust or blue powder in the presence of soluble arsenic and copper compounds, and conducting the precipitation of the nickel, and also, as far as possible, the subsequent separation of the zinc dust precipitate from the purified solution, in the absence of substances foreign to the necessary steps for the dissolving of the zinc in sulphuric acid and the preliminary purification of the zinc sulphate solution with a basic material by the usual method referred to above.

The invention further consists in effecting the precipitation and removal of nickel from solutions as aforesaid, in the absence of organic substances and particularly in the absence of organic bodies enumerated above.

The invention further consists in effecting the precipitation and removal of nickel from solutions as aforesaid, in apparatus which does not expose to the solution organic substances and which preferably exposes only lead surfaces to the solution.

Accordingly in carrying out the invention, care is taken that the zinc solution coming to the nickel purification step e. g. from the step in which the impurities precipitated by the base are removed, is clear and also does not contain dissolved in it any organic impurities. If therefore the solution contains suspended silica or alumina as, for instance, might result from filtering through an imperfect filter cloth, the solution is clarified by suitable means. Such substances as glue from the electrolytic cells and the usual flotation agents, generally pass out of the solution with the silica or alumina precipitate, but organic substances which do not so pass out of solution should not be used in the preliminary treatment steps; or if they are used, steps are to be taken to remove or destroy them before the precipitation of the nickel.

The precipitation treatment is carried out in apparatus which does not expose to the solution any wood, textile material, bitumen made from coal-tar, or the like, and preferably in apparatus in which the walls of the container, the stirring paddles and in general all surfaces which the solution touches, are made of or covered with lead, including iron bolts or the like which could form an electric couple with the lead. Precautions are taken to see that lubricant from moving parts such as the bearings of the stirring paddles etc., cannot enter the zinc solution container. It is also advisable so to arrange artificial lighting, if it is employed, that flying insects attracted by the light do not fall into the treatment vessel.

It is desirable that similar restrictions should be applied to the means by which the nickel precipitate is separated from the zinc solution. However, provided that the separation is effected rapidly, the restrictions need not be so stringently applied as in the precipitation step. It has, for instance, been found practicable in the filtration step to use the ordinary canvas filter cloth notwithstanding that the presence of canvas in the precipitation step completely inhibits the precipitation or if introduced some time after the start of the precipitation tends strongly to cause re-solution of nickel from the precipitate. That canvas may be used in the filtration step is probably due to the cloth becoming rapidly covered with a film of precipitate and to the contact of the solution with it being only momentary. It is however advisable to use metal frames for the filter press.

We claim:—

1. The process of industrially removing nickel from partly purified zinc sulphate solution resulting from dissolving zinc from zinc-containing material and thereby forming an impure zinc sulphate solution, preliminarily purifying the solution by neutralizing the same with basic material and thereby producing an impurity precipitate and removing such impurity precipitate, which consists in adding zinc dust or blue powder to the neutral or slightly acid solution in the presence of soluble copper and arsenic compounds and in the absence of suspended particles of the aforesaid impurity precipitate resulting from imperfect removal of said impurity precipitate.

2. The process which consists in dissolving zinc from zinc-bearing material containing nickel silica or alumina and thereby producing an impure acid zinc sulphate solution containing dissolved silica or alumina, neutralizing the same with a basic material and thus preciptating certain impurities including such silica or alumina, removing the impurity precipitate by filtration in such a manner that the solution from the filtration operation is substantially free from suspended silica or alumina, and further treating the solution for the precipitation of nickel by adding zinc dust or blue powder in the presence of soluble copper and arsenic compounds.

3. The process of industrially removing nickel from zinc sulphate solutions which consists in treating the solution with zinc dust or blue powder in the presence of soluble copper and arsenic compounds and in the absence of organic substances.

4. The process of industrially removing nickel from zinc sulphate solutions which consists in treating the solution with zinc dust or blue powder in the presence of soluble copper and arsenic compounds and in apparatus which exposes only lead surfaces to the solution.

In testimony whereof we affix our signatures.

ROYALE HILLMAN STEVENS.
GERALD CHAD NORRIS.
WILLIAM NELSON WATSON.